US012668284B2

(12) United States Patent (10) Patent No.: US 12,668,284 B2
Alam et al. (45) Date of Patent: Jun. 30, 2026

(54) RETRAINING NEURAL NETWORK MODEL BASED ON SENSOR DATA FILTERED FOR CORNER CASE

(71) Applicant: Atieva, Inc., Newark, CA (US)

(72) Inventors: Ashar Alam, Menlo Park, CA (US); Ephram Chemali, Fremont, CA (US); Nikhil Sudhindra Nakhate, Mountain View, CA (US)

(73) Assignee: Atieva, Inc., Newark, CA (US)

( * ) Notice: Subject to any disclaimer, the term of this patent is extended or adjusted under 35 U.S.C. 154(b) by 118 days.

(21) Appl. No.: 18/704,849

(22) PCT Filed: Oct. 25, 2022

(86) PCT No.: PCT/US2022/078661
§ 371 (c)(1),
(2) Date: Apr. 25, 2024

(87) PCT Pub. No.: WO2023/076903
PCT Pub. Date: May 4, 2023

(65) Prior Publication Data
US 2025/0002054 A1 Jan. 2, 2025

Related U.S. Application Data

(60) Provisional application No. 63/263,140, filed on Oct. 27, 2021.

(51) Int. Cl.
*B60W 60/00* (2020.01)
*B60W 50/00* (2006.01)
(Continued)

(52) U.S. Cl.
CPC ........ *B60W 60/0053* (2020.02); *B60W 50/00* (2013.01); *G06V 10/774* (2022.01);
(Continued)

(58) Field of Classification Search
CPC ......... B60W 60/0053; B60W 60/0054; B60W 60/0055; B60W 2050/0043;
(Continued)

(56) References Cited

U.S. PATENT DOCUMENTS

2018/0157920 A1 6/2018 Hu
2018/0348784 A1 12/2018 Zheng et al.
(Continued)

FOREIGN PATENT DOCUMENTS

WO WO-2019195363 A1 * 10/2019 ............. G11B 20/18

OTHER PUBLICATIONS

Tom Bu et al., "CARLA Simulated Data for Rare Road Object Detection", Sep. 21, 2021, IEEE ITSC, 2021 IEEE ITSC, pp. 2794-2801 (Year: 2021).*
(Continued)

*Primary Examiner* — Erin M Piateski
*Assistant Examiner* — Ashley Tiffany Schoech
(74) *Attorney, Agent, or Firm* — Brake Hughes Bellermann LLP

(57) ABSTRACT

A computer-implemented method comprises: receiving sensor data collected during operation of a vehicle, the sensor data including images from at least one camera on the vehicle and other sensor data from at least one other sensor on the vehicle; identifying, based on the sensor data, a corner case for a first neural network model of an advanced driver assistance system (ADAS) of the vehicle; filtering the images to identify a subset of the images depicting the corner case, the filtering performed using a second neural network model; labeling the subset of the images with regard to the corner case, wherein a remainder of the images are not labeled; and retraining the first neural network model using the labeled subset of the images and a subset of the other sensor data corresponding to the subset of the images.

20 Claims, 5 Drawing Sheets

(51) Int. Cl.

| | |
|---|---|
| *G01S 13/931* | (2020.01) |
| *G01S 17/931* | (2020.01) |
| *G06V 10/774* | (2022.01) |
| *G06V 10/776* | (2022.01) |
| *G06V 10/82* | (2022.01) |
| *G06V 20/56* | (2022.01) |

(52) U.S. Cl.
CPC ............ *G06V 10/776* (2022.01); *G06V 10/82* (2022.01); *G06V 20/56* (2022.01); *B60W 2050/0057* (2013.01); *G01S 13/931* (2013.01); *G01S 17/931* (2020.01); *G06V 2201/08* (2022.01)

(58) Field of Classification Search
CPC ... B60W 2050/0057; B60W 2420/403; B60W 2420/408; G06V 10/774; G06V 10/776; G06V 10/82; G06V 20/56; G06V 2201/08; G06V 10/811; G06V 20/58; G06V 10/7792; G01S 13/931; G01S 13/9318; G01S 13/93185; G01S 17/931; G01S 7/417; G01S 7/4802; G01S 13/867; G01S 13/865; G01S 17/86; G06N 3/045; G06N 3/02; G06N 3/08
See application file for complete search history.

(56) References Cited

U.S. PATENT DOCUMENTS

| | | | |
|---|---|---|---|
| 2018/0373980 A1 | 12/2018 | Huval | |
| 2020/0086837 A1* | 3/2020 | Le Cornec | .......... B60W 50/029 |
| 2020/0134378 A1* | 4/2020 | Viswanathan | ...... G06F 18/2178 |
| 2020/0250902 A1* | 8/2020 | Golov | .............. B60W 50/0205 |
| 2021/0073626 A1 | 3/2021 | Brahma et al. | |
| 2021/0142146 A1* | 5/2021 | Kale | ...................... G06V 10/82 |
| 2021/0249047 A1 | 8/2021 | Levinson et al. | |
| 2021/0387650 A1* | 12/2021 | Li | .......................... B60W 50/14 |
| 2022/0169282 A1* | 6/2022 | Gan | .................. B60W 60/0015 |
| 2023/0368506 A1* | 11/2023 | Nicosevici | ......... G06V 10/7747 |

OTHER PUBLICATIONS

Extended European Search Report for European Application No. 22888436.7, mailed Jun. 20, 2025, 10 pages.

International Search Report and Written Opinion for PCT Application No. PCT/US2022/078661, mailed on Jan. 31, 2023, 8 pages.

S. Yan et al., "Correlations Between Deep Neural Network Model Coverage Criteria and Model Quality", ESEC/FSE 2020: Proceedings of the 28th ACM Joint Meeting on European Software Engineering Conference and Symposium on the Foundations of Software Engineering; https://doi.org/10.1145/3368089.3409671; Nov. 13, 2020, 13 pages.

* cited by examiner

RETRAINING NEURAL NETWORK MODEL BASED ON SENSOR DATA FILTERED FOR CORNER CASE

CROSS-REFERENCE TO RELATED APPLICATIONS

This application is a 35 U.S.C. § 371 National Phase Entry Application from PCT Application No. PCT/US2022/078661, filed on Oct. 25, 2022, entitled "RETRAINING NEURAL NETWORK MODEL BASED ON SENSOR DATA FILTERED FOR CORNER CASE", and designating the U.S., which claims priority to U.S. Provisional Patent Application No. 63/263,140, filed Oct. 27, 2021, and entitled "RETRAINING NEURAL NETWORK MODEL BASED ON SENSOR DATA FILTERED FOR CORNER CASE," the disclosures of which are incorporated by reference herein in their entireties.

TECHNICAL FIELD

This document relates to retraining a neural network model based on sensor data filtered for a corner case.

BACKGROUND

Some vehicles manufactured nowadays are equipped with one or more types of systems that can at least in part handle operations relating to the driving of the vehicle. Some such assistance involves automatically surveying surroundings of the vehicle and being able to take action regarding detected vehicles, pedestrians, or objects.

SUMMARY

In an aspect, a computer-implemented method comprises: receiving sensor data collected during operation of a vehicle, the sensor data including images from at least one camera on the vehicle and other sensor data from at least one other sensor on the vehicle; identifying, based on the sensor data, a corner case for a first neural network model of an advanced driver assistance system (ADAS) of the vehicle; filtering the images to identify a subset of the images depicting the corner case, the filtering performed using a second neural network model; labeling the subset of the images with regard to the corner case, wherein a remainder of the images are not labeled; and retraining the first neural network model using the labeled subset of the images and a subset of the other sensor data corresponding to the subset of the images.

Implementations can include any or all of the following features. Identifying the corner case comprises detecting a discrepancy between first and second neural network outputs, the first output generated based on a first sensor of the vehicle, and the second output generated based on a second sensor of the vehicle. The first output is a camera-based three-dimensional (3D) prediction, and wherein the second output is a lidar-based 3D prediction. Retraining the first neural network model comprises retraining a model for the camera-based 3D prediction. Retraining the first neural network model comprises retraining a model for the lidar-based 3D prediction. The corner case for the first neural network model comprises an event. The corner case for the first neural network model comprises a specification of an object. The specification identifies a type of vehicle. The first neural network model generates a confidence score while the ADAS is controlling the vehicle, and wherein identifying the corner case comprises determining that the confidence score is below a threshold value. Identifying the corner case comprises detecting a driver takeover from the ADAS. Identifying the corner case comprises detecting that a driving maneuver by the ADAS exceeds a threshold value. The filtering is only performed on the images of the sensor data. The first and second neural network models are one and the same. The first and second neural network models are separate from each other. At least the filtering is performed onboard the vehicle. The computer-implemented method further comprises storing triggers on the vehicle, wherein filtering is based on the triggers. The computer-implemented method further comprises providing a new trigger to the vehicle by way of an over the air update. The computer-implemented method further comprises providing the retrained first neural network model to the vehicle by way of an over the air update. At least the filtering and retraining are performed offboard the vehicle.

BRIEF DESCRIPTION OF DRAWINGS

Like reference symbols in the various drawings indicate like elements.

DETAILED DESCRIPTION

Figure 1:
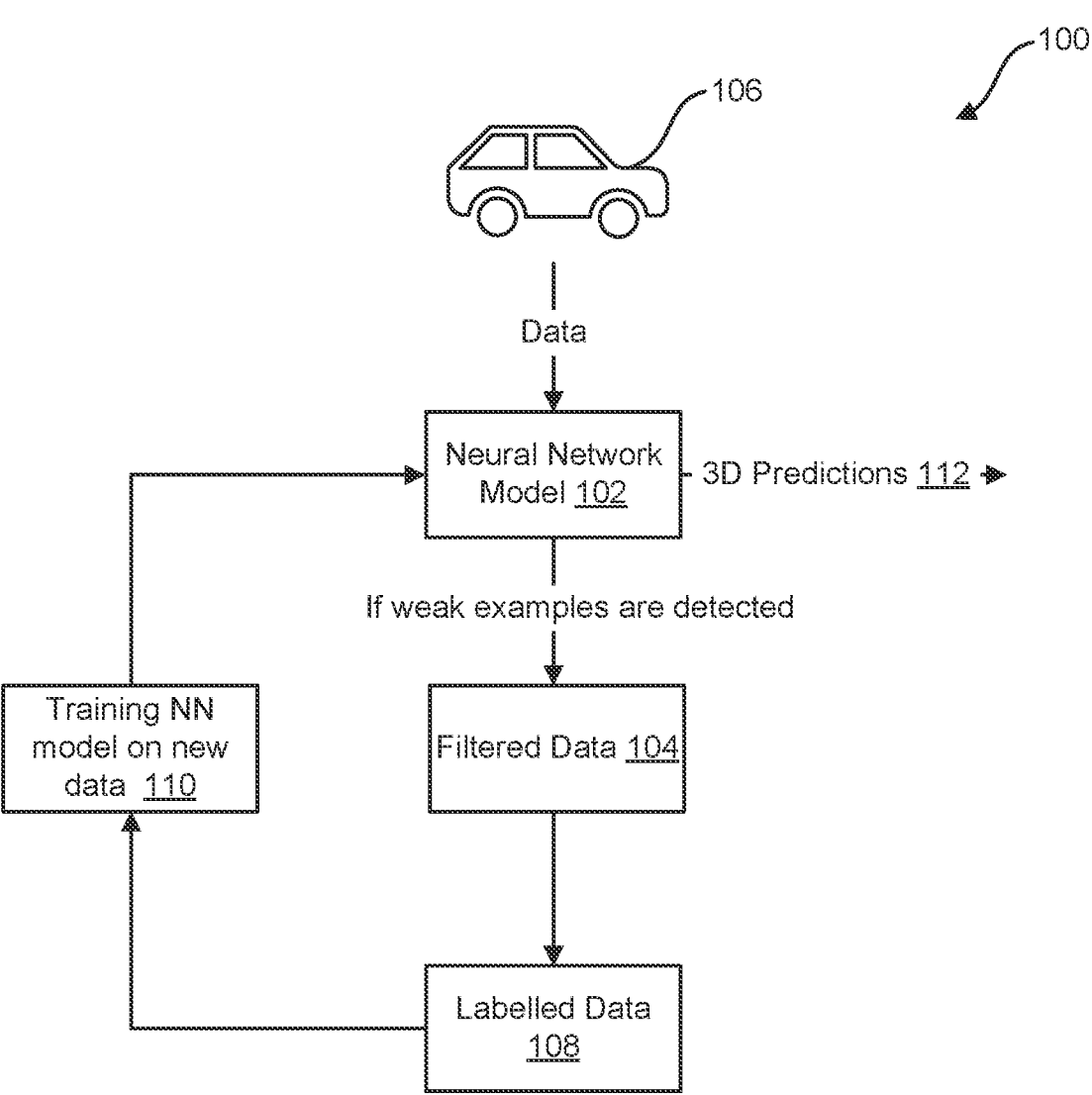
FIG. 1 shows an example of a system that can retrain a neural network model based on sensor data filtered for a corner case.

This document describes examples of systems and techniques for efficient data sampling that can boost performance of a deep learning model. Efficient and scalable corner case data generation can be provided. A machine learning model's performance can be boosted based on retraining with weak examples. Sensor data like images, a lidar point cloud, vehicle signals, etc. and/or other sensor output collected on a vehicle can be filtered in order to collect diverse corner case data to train neural network models and boost their performance. Building a diverse and high-quality dataset may be key to training accurate neural network models and boosting detection performance. A method can be applied to filter specific events for building a diverse dataset from data collected through a vehicle sensor suite.

In some implementations, a method can be performed to diagnose if a machine learning model is experiencing low performance. If so, a system can isolate and collect the data within which the machine learning model is experiencing lower performance, and retrain the model on this exact data. The input data can be any kind of input data, including, but not limited to, event-based data, scenario-based data, data reflecting a change in geographical location, or weather data. Examples of events that may be of interest include, but are not limited to: lane change maneuvers, vehicles that tow boats, or construction zones. Data from sensors including camera images or lidar point clouds can be fed to a neural network model which filters interesting cases as specified by the user. This filtered data is then sent for labelling which is used as training data for neural network models to boost their detection performance. For example, a camera-based model and/or a lidar-based model can be retrained.

A method as described herein can be used online (e.g., while collecting data on the vehicle), or offline (on the data recorded from the vehicles). A method can be used to improve neural network model performance in diverse scenarios including, but not limited to, variation in weather, location, daytime, etc. This can also potentially eliminate the need for simulation data to generate corner cases. The same sensor data that has been collected can be used to extract variety-of-use cases eliminating the need for frequent data collection. Lidar can be used at initial stages to generate this diverse training data based, for example based on discrepancy between camera and lidar data detections. This can mature the camera detection models, which in turn can allow one or more expensive sensors like lidar to be omitted. Methods can be combined with tracking algorithms to generate multimodal datasets.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. In examples herein, any person carried by a vehicle can be referred to as a "driver" or a "passenger" of the vehicle, regardless whether the person is driving the vehicle, or whether the person has access to controls for driving the vehicle, or whether the person lacks controls for driving the vehicle. Vehicles in the present examples are illustrated as being similar or identical to each other for illustrative purposes only.

Examples herein refer to an advanced driving-assistance system (ADAS). Assisted driving involves at least partially automating one or more dynamic driving tasks by way of computer-based operations (e.g., by a processor executing instructions). An ADAS can perform assisted driving and is an example of an assisted-driving system. Assisted driving is performed based in part on the output of one or more sensors typically positioned on, under, or within the vehicle. An ADAS can plan one or more trajectories for a vehicle before and/or while controlling the motion of the vehicle. A planned trajectory can define a path for the vehicle's travel. As such, propelling the vehicle according to the planned trajectory can correspond to controlling one or more aspects of the vehicle's operational behavior, such as, but not limited to, the vehicle's steering angle, gear (e.g., forward or reverse), speed, acceleration, and/or braking.

While an autonomous vehicle is an example of a system that performs assisted driving, not every assisted-driving system is designed to provide a fully autonomous vehicle. Several levels of driving automation have been defined by SAE International, usually referred to as Levels 0, 1, 2, 3, 4, and 5, respectively. For example, a Level 0 system or driving mode may involve no sustained vehicle control by the system. For example, a Level 1 system or driving mode may include adaptive cruise control, emergency brake assist, automatic emergency brake assist, lane-keeping, and/or lane centering. For example, a Level 2 system or driving mode may include highway assist, autonomous obstacle avoidance, and/or autonomous parking. For example, a Level 3 or 4 system or driving mode may include progressively increased control of the vehicle by the assisted-driving system. For example, a Level 5 system or driving mode may require no human intervention of the assisted-driving system.

Examples herein refer to a sensor. A sensor is configured to detect one or more aspects of its environment and output signal(s) reflecting the detection. The detected aspect(s) can be static or dynamic at the time of detection. As illustrative examples only, a sensor can indicate one or more of a distance between the sensor and an object, a speed of a vehicle carrying the sensor, a trajectory of the vehicle, or an acceleration of the vehicle. A sensor can generate output without probing the surroundings with anything (passive sensing, e.g., like an image sensor that captures electromagnetic radiation), or the sensor can probe the surroundings (active sensing, e.g., by sending out electromagnetic radiation and/or sound waves) and detect a response to the probing. Examples of sensors that can be used with one or more embodiments include, but are not limited to: a light sensor (e.g., a camera); a light-based sensing system (e.g., lidar); a radio-based sensor (e.g., radar); an acoustic sensor (e.g., an ultrasonic device and/or a microphone); an inertial measurement unit (e.g., a gyroscope and/or accelerometer); a speed sensor (e.g., for the vehicle or a component thereof); a location sensor (e.g., for the vehicle or a component thereof); an orientation sensor (e.g., for the vehicle or a component thereof); an inertial measurement unit; a torque sensor; a temperature sensor (e.g., a primary or secondary thermometer); a pressure sensor (e.g., for ambient air or a component of the vehicle); a humidity sensor (e.g., a rain detector); or a seat occupancy sensor.

Examples herein refer to a lidar. As used herein, a lidar includes any object detection system that is based at least in part on light, wherein the system emits the light in one or more directions. The light can be generated by a laser and/or by a light-emitting diode (LED), to name just two examples. The lidar can emit light pulses in different directions (e.g., characterized by different polar angles and/or different azimuthal angles) so as to survey the surroundings. For example, one or more laser beams can be impinged on an orientable reflector for aiming of the laser pulses. The lidar can detect the return signals by a suitable sensor to generate an output. A scanning lidar or a non-mechanical scanning lidar can be used, to name just two examples.

Examples herein refer to a neural network model. As used herein, a neural network model is a machine-learning tool implemented in form of processing nodes (sometimes referred to as artificial neurons) defined to receive one or more inputs (e.g., from sensor output and/or from another processing node), and to use the input(s) to generate an output (e.g., to another processing node or as a final output of the neural network model Example herein refer to a corner case of a neural network model. As used herein, a corner case is a feature or phenomenon that the neural network model will encounter only relatively rarely in its intended use. The corner case can be quantified as occurring less often than about 5% of the time, such as at most about 1% (e.g., below about 0.5%) of the time in the training data provided to the neural network model.

FIG. 1 shows an example of a system 100 that can retrain a neural network model 102 based on sensor data 104 filtered for a corner case. The system 100 or components thereof can be used with one or more other examples described elsewhere herein. The system 100 is used together with a vehicle 106 that has an ADAS and multiple sensors. The vehicle 106 can be an individual vehicle or can schematically represent a fleet of vehicles under common control (e.g., because the vehicles 106 are made by the same manufacturer, or because the vehicles 106 are owned by a common entity). Sensor data is collected during operation of the vehicle 106.

The neural network model 102 is a pretrained neural network model. One or more corner cases for the neural network model 102 can be identified. Corner cases can be identified based on sensor-related discrepancy, on detecting one or more events, on detecting a specified object, on a confidence score generated by the neural network model 102, on detecting a driver takeover of the vehicle 106, or on detecting that a driving maneuver by the ADAS exceeds a threshold value, to name just a few examples. Existence of a corner case can indicate that the neural network model 102 should be subjected to additional training to improve its performance in that regard.

Generally, the neural network model 102 can be trained for performing one or more driving tasks, including, but not limited to, object detection and/or lane detection. The vehicle(s) 106 can be driven over shorter or longer distances to collect video data, camera still images, lidar point cloud data, radar echoes, and other vehicle sensor outputs. Such data can then be processed in one or more ways to prepare for the training of the neural network model 102. In some implementations, images from the vehicle can be sent to vendors who specialize in performing labeling on the data to generate labelled data 108. The labelled data 108 can include, but is not limited to, annotations of an image as containing a person, and/or a car. The labeling vendor can use lidar point cloud data to determine a relevant position in three dimensions (3D), and the size of a bounding box around the detected object, to name just a few examples.

Typically, to obtain more data once a corner case has been identified requires that the vehicle 106 be driven around some more. Moreover, even if hours and hours of data are been collected, the vehicle 106 may have driven on roads that have no other vehicles or whatever the feature of interest is. Applying the labeling to the entire collection of images to generate the labelled data 108 for purposes of overcoming weak training on a corner case can be prohibitively labor intensive. The labeling may therefore not be cost effective if it were applied to all of the newly gathered sensor data.

A filtering can therefore be performed. The neural network model 102 can be run on the collected raw data to identify images relating to the corner case. To do so, the neural network model 102 can be provided with specifications for the unique event being filtered. Such specifications can be referred to as triggers. Specific cases can include a single specification, an event, or combinations of these. For example, the neural network model 102 may be looking for a specific type of vehicle at night, the specific type of vehicle in rain, or the specific type of vehicle in an urban scenario. These triggers could also be scenario-based, including but not limited to, a road feature or phenomenon, a particular maneuver by a driver, etc. Multimodal sensor data can be used in the filtering, including but not limited to, image frames, lidar frames, vehicle signals, global positioning system (GPS) information, weather data, or timestamps. For example, image recognition can be performed on the camera images (and not on any other sensor data), to identify the timestamp(s) that are relevant for the corner case. The filtered data 104 can therefore include the frames and associated sensor data associated with a corner case.

The filtered data 104 can be sent to one or more annotators (e.g., labeling vendors) for precise labelling according to predefined labelling guidelines. The annotator can return labelled data 108. The labelled data 108 represents a diverse dataset in that it is reflective of the situations involving a corner case that may not have been prominently represented in earlier training data for the neural network model 102. As such, the labelled data 108 can be used in training 110 of the neural network model 102 to boost its performance. This process can be repeated in a cycle, which can continuously improve the model performance, for example in its ability to make 3D predictions. Moreover, the method can be expanded to create different kind of datasets ranging from detection, segmentation, tracking to intent prediction. The neural network model 102 can then generate predictions 112 (e.g., 3D predictions).

One or more of the aspects of the system 100 can be implemented on the vehicle 106. In some implementations, the filtering to generate the filtered data 104 can be performed onboard the vehicle 106. In some implementations, the filtering to generate the filtered data 104 and the retraining at the training 110 can be performed offboard the vehicle 106. In some implementations, one or more over the air updates can be provided to the vehicle 106 (e.g., by cellular or Wi-Fi connection). For example, a retrained model (e.g., a camera-based model and/or a lidar-based model) can be provided to the vehicle 106 by way of an over the air update. In some implementations, filtering can be performed at least in part on the vehicle 106. For example, one or more new triggers can then be provided to the vehicle 106 by way of an over the air update for use in the filtering.

Figure 2:
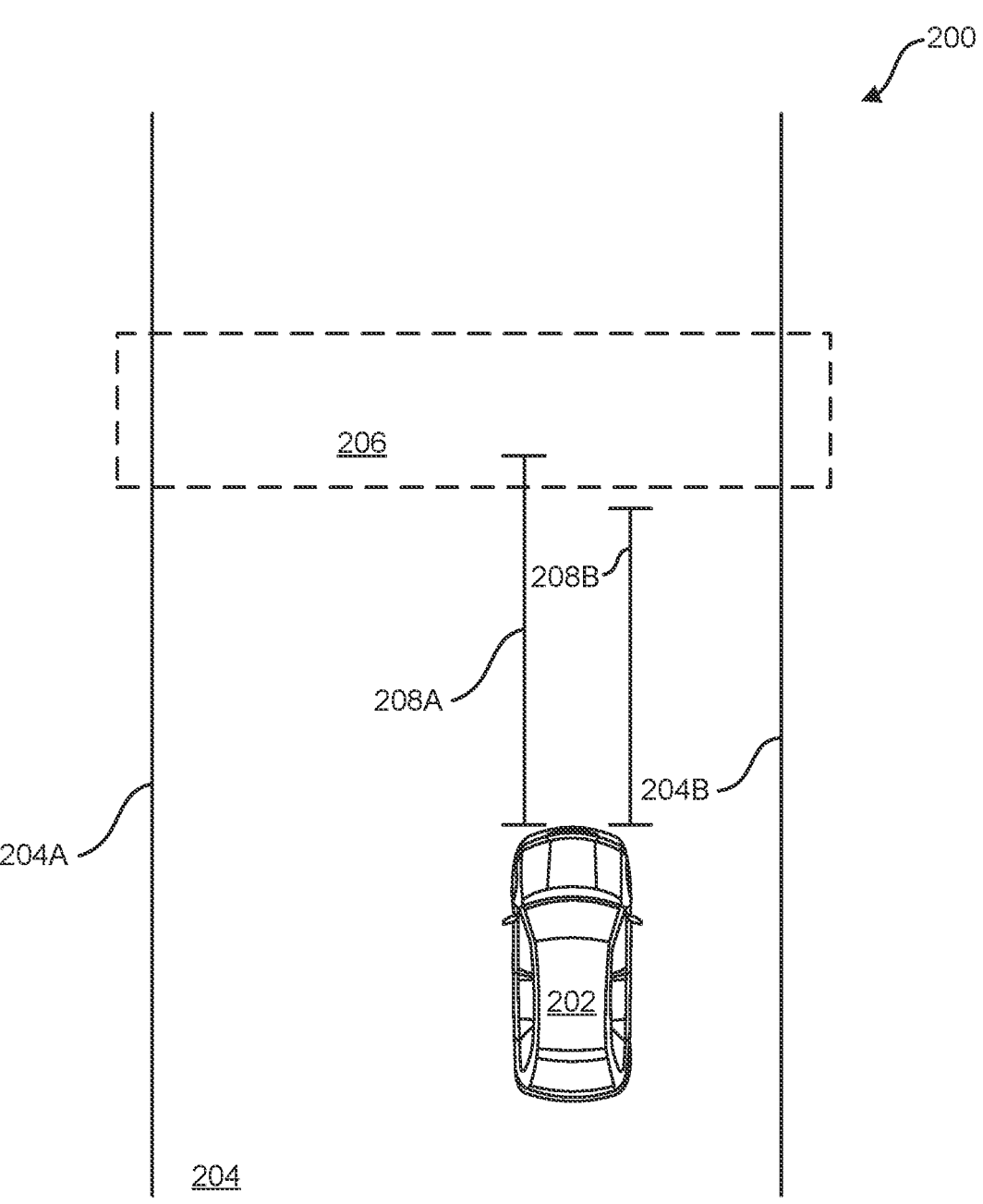
FIG. 2 schematically shows an example of a vehicle using the neural network model of FIG. 1 to make predictions.

FIG. 2 schematically shows an example 200 of a vehicle 202 using the neural network model 102 of FIG. 1 to make predictions. The vehicle 202 is here shown as traveling on a roadway 204 defined between respective lane boundaries 204A-204B. A phenomenon relating to the vehicle 202 in its current situation on the roadway 204 can be considered a corner case. The phenomenon is here conceptually represented as a box 206. The box 206 here extends across the roadway 204 and intersects each of the lane boundaries 204A-204B, which schematically illustrates that the corner case can relate to anything appearing in the roadway 204 or near the lane boundaries 204A-204B where it may affect the vehicle 202. The box 206 can represent a specified type of object (including, but not limited to, a vehicle, a pedestrian, or an animal). The box 206 can represent a specified type of location, road surface or weather phenomenon. The box 206 can represent a particular event, the occurrence of which constitutes a corner case.

In some implementations, the ADAS of the vehicle 202 can make one or more predictions regarding the surrounding 3D environment. One example of a 3D prediction is to generate an estimate of the distance to an identified object. For example, a lidar can generate a 3D distance prediction. As another example, the cameras of the vehicle 202 can generate a 3D distance prediction. The neural network model 102 can include respective models relating to different ones of the sensors of the vehicle 202, and such models can be used in generating the predictions. In some implementations, a lidar 3D prediction model can be applied to lidar point cloud data regarding the current position of the vehicle 202 on the roadway 204, to generate a lidar 3D prediction 208A. For example, the 3D prediction 208A can represent the predicted distance from the vehicle 202 to the corner case represented by the box 206 based on lidar data. In some implementations, a camera 3D prediction model can be applied to camera image data regarding the current position of the vehicle 202 on the roadway 204 (e.g., from one or more cameras), to generate a camera 3D prediction 208B. For example, the 3D prediction 208B can represent the predicted distance from the vehicle 202 to the corner case represented by the box 206 based on camera data.

Diagnosis can be performed to identify weak 3D camera detection performance compared to lidar. This can involve detecting a discrepancy between first and second neural network outputs. For camera 3D detection-type neural networks, the camera-based models' 3D predictions can be compared to a lidar model's performance in a relevant regard. Examples can be collected when camera models are predicting different values than the lidar models and thereafter be used during training to continuously boost the camera model's performance. A continuous cycle of collecting weak examples, and actively training the camera models, can boost the camera model's performance to the level of lidar-based models. For example, expensive sensors such as lidar can be removed to reduce overall cost of vehicles. In some implementations, the lidar-based model can also or instead be retrained using the filtered data. For example, this is possible because the filtered data also includes lidar point clouds.

Figure 3:
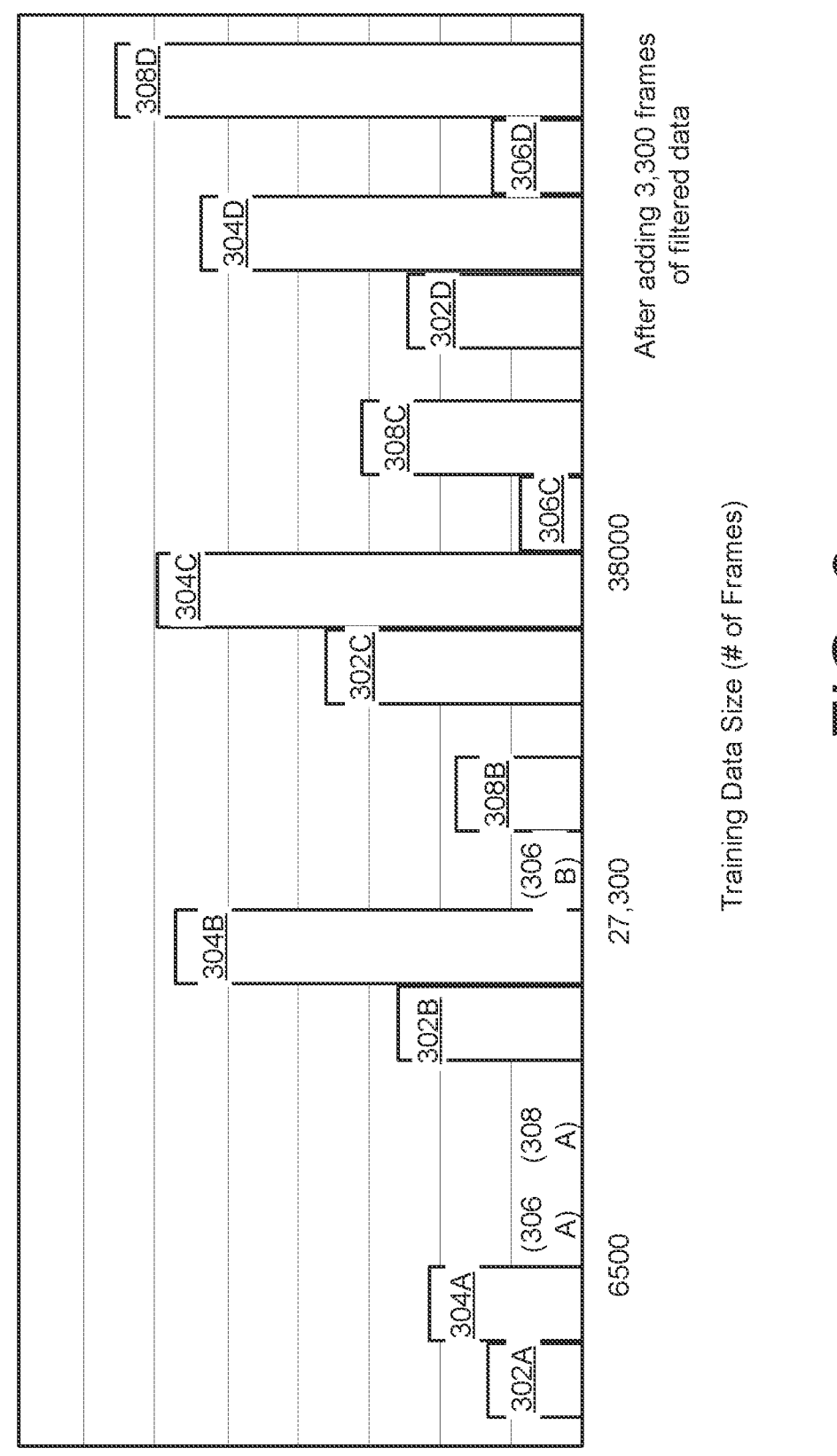
FIG. 3 shows an example of a diagram showing a metric as a function of training data size, with and without corner case filtering.

FIG. 3 shows an example of a diagram 300 showing a metric as a function of training data size, with and without corner case filtering. In some implementations, the metric relates to detection accuracy and thereby reflects the quality of predictions by a neural network model. For example, the metric can indicate the likelihood of accurate detections of respective phenomena encountered by the vehicle, and as such can reflect the confidence score of the neural network model.

Here, each of performance values 302A-302D relates to the ability of the neural network model to detect a first phenomenon (e.g., a type of object, or a particular situation or other event). Each of performance values 304A-304D relates to the ability of the neural network model to detect a second phenomenon (e.g., a type of object, or a particular situation or other event). Each of performance values 306A-306D relates to the ability of the neural network model to detect a third phenomenon (e.g., a type of object, or a particular situation or other event). Each of performance values 308A-308D relates to the ability of the neural network model to detect a fourth phenomenon (e.g., a type of object, or a particular situation or other event).

The performance values 302A, 304A, 306A, and 308A represent the neural network model's ability to detect the first through fourth phenomena, respectively, based on training data of 6,500 frames. Here, the performance values 306A and 308A are very low, suggesting that the neural network model could benefit from additional training (e.g., these are corner cases). The performance values 302B, 304B, 306B, and 308B represent the neural network model's ability to detect the first through fourth phenomena, respectively, based on training data of 27,300 frames. Generally, the performance values 302B, 304B, 306B, and 308B increased the metric based on the larger number of frames in the training data. Again, the performance value 306B is very low, reflecting that this is a corner case. The performance values 302C, 304C, 306C, and 308C represent the neural network model's ability to detect the first through fourth phenomena, respectively, based on training data of 38,000 frames. Generally, the performance values 302C, 304C, 306C, and 308C increased the metric based on the larger number of frames in the training data.

To generate the performance values 302D, 304D, 306D, and 308D, 3,300 frames' worth of filtered sensor data was added. Here, the fourth phenomenon was chosen as a corner case. A neural network model was set to filter through the images available from the corpus of the received vehicle data. Once the timestamps for the fourth phenomenon had been identified, the corresponding frames, and the other sensor data relating to these frames, constituted the filtered data 104 (FIG. 1). The images of the fourth phenomenon in the filtered data were then subjected to labeling. Finally, the neural network model was retrained based on the 3,300 filtered frames and their associated data. The result is that the performance value 308D has significantly increased compared to all the previous sizes of training data sets. Also, this increase in detection accuracy for the fourth phenomenon was obtained by adding a smaller number of frames' worth of training data than was done in each of the three preceding stages of the diagram 300.

Figure 4:
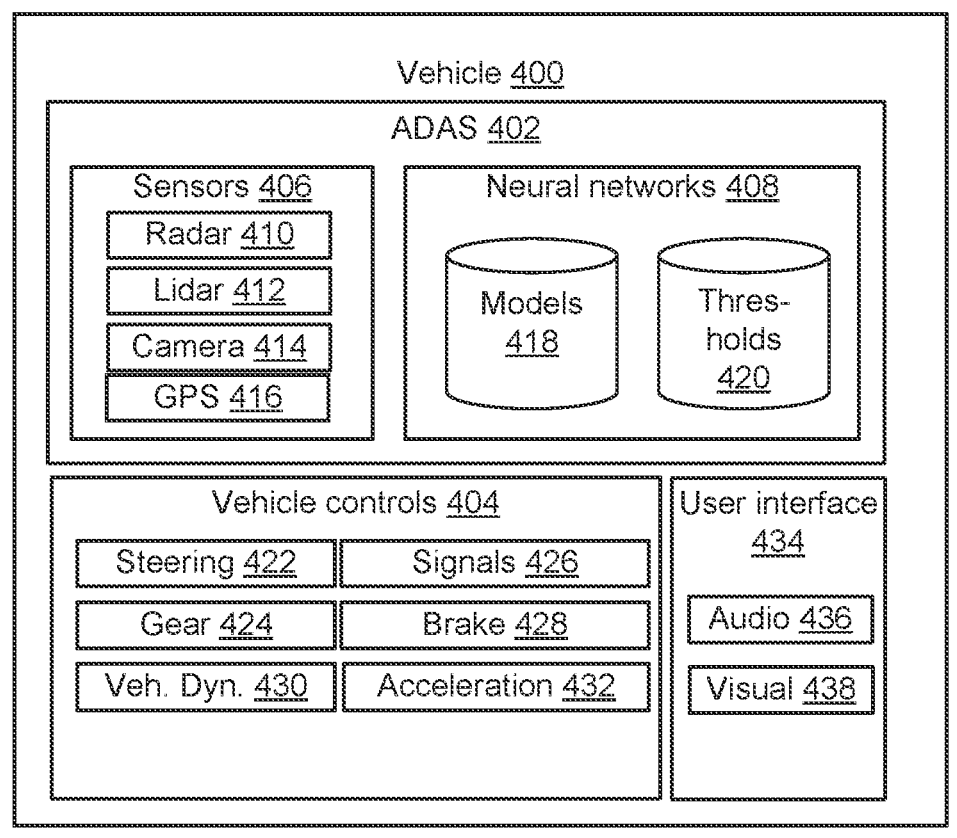
FIG. 4 shows an example of a vehicle.

FIG. 4 shows an example of a vehicle 400. The vehicle 400 can be used with one or more other examples described elsewhere herein. The vehicle 400 includes an ADAS 402 and vehicle controls 404. The ADAS 402 includes sensors 406 and a neural networks component 408. Other aspects that the vehicle 400 may include, including, but not limited to, other components of the vehicle 400 where the ADAS 402 may be implemented, are omitted here for simplicity.

The sensors 406 are here described as also including appropriate circuitry and/or executable programming for processing sensor output and performing a detection based on the processing. The sensors 406 can include a radar 410. In some implementations, the radar 410 can include any object detection system that is based at least in part on radio waves. For example, the radar 410 can be oriented in a forward direction relative to the vehicle and can be used for detecting at least a distance to one or more other objects (e.g., another vehicle). The radar 410 can detect the surroundings of the vehicle 400 by sensing the presence of an object in relation to the vehicle 400.

The sensors 406 can include a lidar 412. In some implementations, the lidar 412 can include any object detection system that is based at least in part on laser light or LED light. For example, the lidar 412 can be oriented in any direction relative to the vehicle and can be used for detecting at least a distance to one or more other objects (e.g., another vehicle). The lidar 412 can detect the surroundings of the vehicle 400 by sensing the presence of an object in relation to the vehicle 400.

The sensors 406 can include one or more cameras 414. In some implementations, the cameras 414 can include any image sensor whose signal(s) the vehicle 400 takes into account. For example, the cameras 414 can be oriented in any of multiple directions relative to the vehicle and can be used for detecting vehicles or other objects, lanes, lane markings, curbs, and/or road signage.

The sensors 406 can include a GPS 416. In some implementations, the GPS 416 can include any receiver used in determining or estimating location based on satellite signals.

Any of the sensors 406 alone, or two or more of the sensors 406 collectively, can detect, whether or not the ADAS 402 is controlling motion of the vehicle 400, the surroundings of the vehicle 400. In some implementations, at least one of the sensors 406 can generate an output that is taken into account in providing a prompt to a driver, and/or in controlling motion of the vehicle 400. For example, the output of two or more sensors can be combined. In some implementations, one or more other types of sensors can additionally or instead be included in the sensors 406. The ADAS 402 can perform motion planning and/or plan a trajectory for the vehicle 400 based on the output(s) of one or more of the sensors 406.

The neural networks component 408 includes neural networks models 418 and definitions of thresholds 420.

Each of the neural networks models 418 can be trained based on the same or different training data than any other one of the neural networks models 418. Some of the neural networks models 418 can be dedicated to one or more specific sensors. For example, to make 3D predictions, one of the neural networks models 418 can be a lidar model and another can be a camera model. Some of the neural networks models 418 can be relatively heavier models that are configured for performing 3D detection. Others of the neural networks models 418 can be relatively simpler or lighter models that may be more efficient at collecting or filtering images. In some implementations, the confidence score of one of the neural networks models 418 (e.g., a 3D-focused model) can exhibit a confidence score that is below a threshold value of one of the thresholds 420. This behavior can identify a corner case that is then filtered using another one of the neural networks models 418 (e.g., a model that is adept at quickly recognizing visual content (e.g., by image detection). That is, the model of the neural networks models 418 for which the corner case is detected, and which can benefit from additional training on filtered data, can be the same model as, or a different model from, the model of the neural networks models 418 that is used for the filtering.

In some implementations, a corner case can be identified based on detecting a driver takeover from the ADAS 402. For example, if the driver of the vehicle 400 (who may have been only partially, or not at all, involved in controlling the vehicle 400 during ADAS operation) decides to take over control of one or more aspects of vehicle operation (including, but not limited to, steering and/or braking) this can be an indication of a corner case for the neural networks component 408.

In some implementations, a corner case can be identified based on detecting that a driving maneuver of the ADAS 402 exceeds a threshold value of one of the thresholds 420. For example, if the ADAS 402 steers sharply to the side, or applies brakes heavily, this can be an indication of a corner case for the neural networks component 408.

The vehicle controls 404 can include a steering control 422. In some implementations, the ADAS 402 and/or another driver of the vehicle 400 controls the trajectory of the vehicle 400 by adjusting a steering angle of at least one wheel by way of manipulating the steering control 422. The steering control 422 can be configured for controlling the steering angle though a mechanical connection between the steering control 422 and the adjustable wheel, or can be part of a steer-by-wire system.

The vehicle controls 404 can include a gear control 424. In some implementations, the ADAS 402 and/or another driver of the vehicle 400 uses the gear control 424 to choose from among multiple operating modes of a vehicle (e.g., a Drive mode, a Neutral mode, or a Park mode). For example, the gear control 424 can be used to control an automatic transmission in the vehicle 400.

The vehicle controls 404 can include signal controls 426. In some implementations, the signal controls 426 can control one or more signals that the vehicle 400 can generate. For example, the signal controls 426 can control a turn signal and/or a horn of the vehicle 400.

The vehicle controls 404 can include brake controls 428. In some implementations, the brake controls 428 can control one or more types of braking systems designed to slow down the vehicle, stop the vehicle, and/or maintain the vehicle at a standstill when stopped. For example, the brake controls 428 can be actuated by the ADAS 402. As another example, the brake controls 428 can be actuated by the driver using a brake pedal.

The vehicle controls 404 can include a vehicle dynamic system 430. In some implementations, the vehicle dynamic system 430 can control one or more functions of the vehicle 400 in addition to, or in the absence of, or in lieu of, the driver's control. For example, when the vehicle comes to a stop on a hill, the vehicle dynamic system 430 can hold the vehicle at standstill if the driver does not activate the brake control 424 (e.g., step on the brake pedal).

The vehicle controls 404 can include an acceleration control 432. In some implementations, the acceleration control 432 can control one or more types of propulsion motor of the vehicle. For example, the acceleration control 432 can control the electric motor(s) and/or the internal-combustion motor(s) of the vehicle 400.

The vehicle 400 can include a user interface 434. The user interface 434 can include an audio interface 436. In some implementations, the audio interface 436 can include one or more speakers positioned in the passenger compartment. For example, the audio interface 436 can at least in part operate together with an infotainment system in the vehicle.

The user interface 434 can include a visual interface 438. In some implementations, the visual interface 438 can include at least one display device in the passenger compartment of the vehicle 400. For example, the visual interface 438 can include a touchscreen device and/or an instrument cluster display. In some implementations, a user can make an input using the user interface 434 to identify a corner case. For example, the vehicle 400 can then record the most recent x number of seconds' worth of sensor data as an indication of the corner case.

Figure 5:
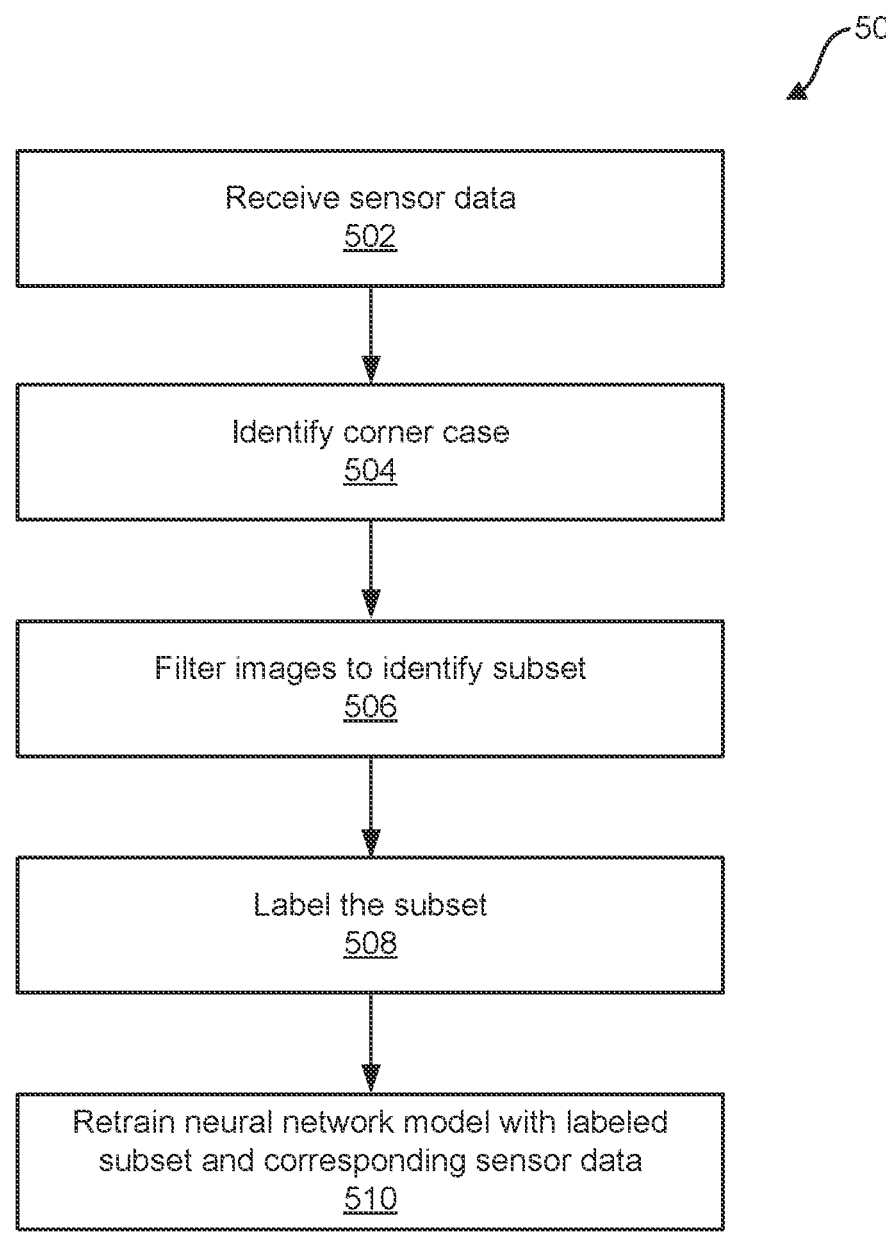
FIG. 5 shows an example flowchart of a method for retraining a neural network model based on sensor data filtered for a corner case.

FIG. 5 shows an example flowchart of a method for retraining a neural network model based on sensor data filtered for a corner case. The method 500 can be used with one or more other examples described elsewhere herein. More or fewer operations than shown can be performed. Two or more operations can be performed in a different order unless otherwise indicated.

At operation 502, sensor data collected during operation of a vehicle can be received. The sensor data can include images from at least one camera on the vehicle and other sensor data from at least one other sensor on the vehicle. In FIG. 4, for example, images from the camera(s) 414 and other sensor data from any other(s) of the sensors 406 can be received.

At operation 504 there can be identified, based on the sensor data, a corner case for a first neural network model of an ADAS of the vehicle. In FIG. 2, for example, a sensor-related discrepancy between the 3D prediction 208A and the camera 3D prediction 208B can be detected to identify a corner case. As another example, a corner case can be identified based on detecting one or more events, detecting a specified object, reading a confidence score generated by the neural network model 102, detecting a driver takeover of the vehicle 106, detecting that a driving maneuver by the ADAS exceeds a threshold value, and/or by receiving a user input at the vehicle.

At operation 506, the images can be filtered to identify a subset of the images depicting the corner case. In FIG. 3, for example, the 6,500 training frames, the 27,300 training frames, the 38,000 training frames, or a different sensor data collection can be filtered to identify a subset of the respective image contents. The filtering performed using a second neural network model (e.g., the same one having the corner case, or another neural network model).

At operation 508, the subset of the images can be labeled with regard to the corner case. In FIG. 3, for example, the 3,300 frames can be labeled with regard to the further phenomenon. A remainder of the images are not labeled. For example, this can reduce costs significantly in that images not relating to the corner case need not be labeled.

At operation 510, the first neural network model can be retrained using the labeled subset of the images and a subset of the other sensor data corresponding to the subset of the images. In FIG. 4, for example, output of any other(s) of the sensors 406 that corresponds to the timestamps of the subset of the images that were identified in operation 506 can be included in the training. A remainder of the sensor data received at operation 502 that does not correspond to the subset of the images that were identified in operation 506 is not included in the training.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method comprising:

receiving sensor data collected during operation of a vehicle, the sensor data including images from at least one camera on the vehicle and other sensor data from at least one other sensor on the vehicle;

identifying, based on the sensor data, a corner case for a first neural network model of an advanced driver assistance system (ADAS) of the vehicle, the corner case being identified based on being a feature or phenomenon that the first neural network model will encounter only less often than about 5% of the time in training data provided to the first neural network model;

filtering the images to identify a subset of the images depicting the corner case, the filtering performed using a second neural network model;

labeling the subset of the images with regard to the corner case, wherein a remainder of the images are not labeled; and retraining the first neural network model using the labeled subset of the images and a subset of the other sensor data corresponding to the subset of the images.

2. The computer-implemented method of claim 1, wherein identifying the corner case comprises detecting a discrepancy between first and second neural network outputs, the first output generated based on a first sensor of the vehicle, and the second output generated based on a second sensor of the vehicle.

3. The computer-implemented method of claim 2, wherein the first output is a camera-based three-dimensional (3D) prediction, and wherein the second output is a lidar-based 3D prediction.

4. The computer-implemented method of claim 3, wherein retraining the first neural network model comprises retraining a model for the camera-based 3D prediction.

5. The computer-implemented method of claim 3, wherein retraining the first neural network model comprises retraining a model for the lidar-based 3D prediction.

6. The computer-implemented method of claim 1, wherein the corner case for the first neural network model comprises an event.

7. The computer-implemented method of claim 1, wherein the corner case for the first neural network model comprises a specification of an object.

8. The computer-implemented method of claim 7, wherein the specification identifies a type of vehicle.

9. The computer-implemented method of claim 1, wherein the first neural network model generates a confidence score while the ADAS is controlling the vehicle, and wherein identifying the corner case comprises determining that the confidence score is below a threshold value.

10. The computer-implemented method of claim 1, wherein identifying the corner case comprises detecting a driver takeover from the ADAS.

11. The computer-implemented method of claim 1, wherein identifying the corner case comprises detecting that a driving maneuver by the ADAS exceeds a threshold value.

12. The computer-implemented method of claim 1, wherein the filtering is only performed on the images of the sensor data.

13. The computer-implemented method of claim 1, wherein the first and second neural network models are one and the same.

14. The computer-implemented method of claim 1, wherein the first and second neural network models are separate from each other.

15. The computer-implemented method of claim 1, wherein at least the filtering is performed onboard the vehicle.

16. The computer-implemented method of claim 15, further comprising storing triggers on the vehicle, wherein filtering is based on the triggers.

17. The computer-implemented method of claim 16, further comprising providing a new trigger to the vehicle by way of an over the air update.

18. The computer-implemented method of claim 1, further comprising providing the retrained first neural network model to the vehicle by way of an over the air update.

19. The computer-implemented method of claim 1, wherein at least the filtering and retraining are performed offboard the vehicle.

20. A computer-readable medium including instructions that when executed by a processor cause the processor configured to perform the method of claim 1.

* * * * *